(12) United States Patent  
Sureshchandra et al.

(10) Patent No.: US 8,996,610 B1  
(45) Date of Patent: Mar. 31, 2015

(54) PROXY SYSTEM, METHOD AND COMPUTER PROGRAM PRODUCT FOR UTILIZING AN IDENTIFIER OF A REQUEST TO ROUTE THE REQUEST TO A NETWORKED DEVICE

(75) Inventors: Jayesh Sureshchandra, San Francisco, CA (US); Steven Lawrance, San Francisco, CA (US); Ryan Guest, Stockton, CA (US); Addison Luh, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 279 days.

(21) Appl. No.: 12/896,745

(22) Filed: Oct. 1, 2010

Related U.S. Application Data

(60) Provisional application No. 61/313,994, filed on Mar. 15, 2010.

(51) Int. Cl.
```
G06F 15/16      (2006.01)
G06F 15/173     (2006.01)
G06F 17/30      (2006.01)
```

(52) U.S. Cl.
CPC .................. *G06F 17/30286* (2013.01)
USPC ........ 709/203; 709/224; 709/227; 705/26.35; 705/1.1

(58) Field of Classification Search
CPC ... H04L 67/327; H04L 67/28; H04L 67/1002; H04L 41/5083; G06F 17/30587; G06F 3/0647; G06F 9/4856
USPC ................... 726/12; 705/1.1, 26.35; 709/219, 709/223–230, 238, 200–211; 370/400, 392; 707/999.1
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,081,840 A * | 6/2000 | Zhao ............................ 709/224 |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

OTHER PUBLICATIONS

U.S. Appl. No. 60/828,192, filed Oct. 4, 2006.

*Primary Examiner* — Wing F Chan
*Assistant Examiner* — Raji Krishnan
(74) *Attorney, Agent, or Firm* — Zilka-Kotab, PC (57) ABSTRACT

In accordance with embodiments, there are provided proxy mechanisms and methods for utilizing an identifier of a request to route the request to a networked device. These proxy mechanisms and methods for utilizing an identifier of a request to route the request to a network device can avoid delays associated with using DNS to route requests, while further reducing a number of IP addresses necessary for routing such requests to various network devices.

12 Claims, 5 Drawing Sheets

(56) References Cited

U.S. PATENT DOCUMENTS

| | | | |
|---|---|---|---|
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,792,463 B1* | 9/2004 | Lamberton et al. | 709/227 |
| 6,804,330 B1 | 10/2004 | Jones et al. | |
| 6,823,391 B1* | 11/2004 | Deen et al. | 709/229 |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,181,758 B1 | 2/2007 | Chan | |
| 7,209,929 B2 | 4/2007 | Dominguez, Jr. et al. | |
| 7,289,976 B2 | 10/2007 | Kihneman et al. | |
| 7,315,541 B1* | 1/2008 | Housel et al. | 370/392 |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 2001/0044791 A1 | 11/2001 | Richter et al. | |
| 2001/0056416 A1* | 12/2001 | Garcia-Luna-Aceves | 707/2 |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0104022 A1* | 8/2002 | Jorgenson | 713/201 |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0061278 A1* | 3/2003 | Agarwalla et al. | 709/203 |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0217139 A1* | 11/2003 | Burbeck et al. | 709/224 |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0091310 A1* | 4/2005 | Salomon | 709/203 |
| 2005/0223022 A1 | 10/2005 | Weissman et al. | |
| 2005/0283478 A1 | 12/2005 | Choi et al. | |
| 2006/0021019 A1 | 1/2006 | Hinton et al. | |
| 2006/0206834 A1 | 9/2006 | Fisher et al. | |
| 2006/0235715 A1* | 10/2006 | Abrams et al. | 705/1 |
| 2007/0061462 A1* | 3/2007 | Kim et al. | 709/226 |
| 2008/0010243 A1 | 1/2008 | Weissman et al. | |
| 2008/0082555 A1* | 4/2008 | Salmon et al. | 707/100 |
| 2008/0167970 A1* | 7/2008 | Nissim | 705/26 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2009/0307307 A1* | 12/2009 | Igarashi | 709/203 |
| 2013/0218948 A1 | 8/2013 | Jakobson | |
| 2013/0218949 A1 | 8/2013 | Jakobson | |
| 2013/0218966 A1 | 8/2013 | Jakobson | |

\* cited by examiner

PROXY SYSTEM, METHOD AND COMPUTER PROGRAM PRODUCT FOR UTILIZING AN IDENTIFIER OF A REQUEST TO ROUTE THE REQUEST TO A NETWORKED DEVICE

CLAIM OF PRIORITY

This application claims the benefit of U.S. Provisional Patent Application No. 61/313,994 entitled "Method And System For Dynamically Routing Requests Using Squid," by Sureshehandra et al., filed Mar. 15, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to requests for content, and more particularly to routing requests for content.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Traditionally, when a request for content is received for being routed to a network device storing the requested content, a Domain Name System (DNS) has been utilized for identifying the device to which the request is to be routed. Specifically, DNS has typically been utilized for accessing content over the Internet. Unfortunately, various limitations are associated with the use of DNS when routing requests.

For example, a unique interne protocol (IP) address must be utilized for each network device storing content that is capable of being requested. Thus, a limit on a number of available IP addresses in turn limits the number of network devices to which requests may be routed. As another example, where multiple content sources store content on a single network device (e.g. share the single network device), the content sources must also share a domain name specific to that device. In addition, if one of the content sources moves their content to another network device, DNS lag due to network caches maintaining old mappings may still direct entities requesting the content to the original network device.

BRIEF SUMMARY

In accordance with embodiments, there are provided proxy mechanisms and methods for utilizing an identifier of a request to route the request to a networked device. These proxy mechanisms and methods for utilizing an identifier of a request to route the request to a network device can avoid delays associated with using DNS to route requests, while further reducing a number of IP addresses necessary for routing such requests to various network devices.

In an embodiment and by way of example, a proxy method is provided for utilizing an identifier of a request to route the request to a networked device. In use, a request for content stored on one of a plurality of devices connected to a network is received at a proxy. Additionally, the one of the plurality of devices on which the content is stored is determined, utilizing an identifier associated with the content included in the received request. Further, the received request is routed to the determined one of the plurality of devices.

While the present invention is described with reference to an embodiment in which techniques utilizing an identifier of a request to route the request to a networked device are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Proxy systems and methods are provided for utilizing an identifier of a request to route the request to a networked device.

In the past, DNS has typically been utilized for routing requests to the networked devices to which they are destined. Unfortunately, DNS generally involves a unique IP address being associated with each network device storing content that is capable of being requested, thus limiting a number of network devices to which requests may be routed when the number of available IP addresses is limited. Furthermore, caching of out-of-date DNS mappings oftentimes results in delays associated with sending requests to a correct network device.

Thus, proxy systems and methods are provided for utilizing an identifier of a request to route the request to a networked device, such that delays associated with using DNS to route requests may be avoided, while further reducing a number of IP addresses necessary for routing such requests to various network devices.

Next, proxy systems and methods are provided for utilizing an identifier of a request to route the request to a networked device will be described with reference to exemplary embodiments.

Figure 1:
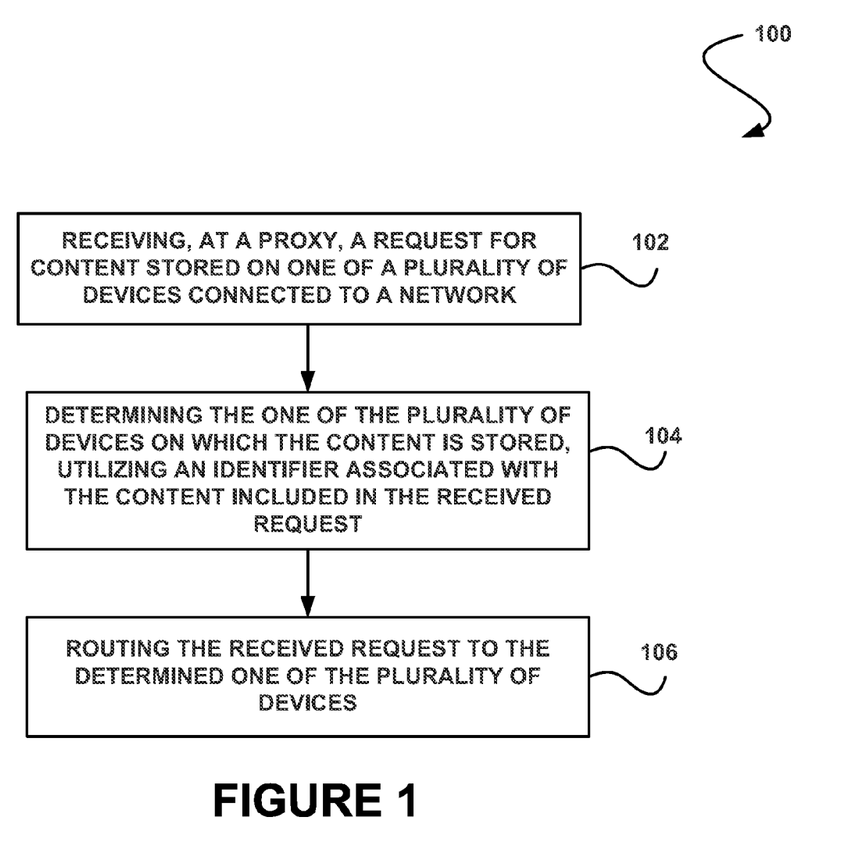
FIG. 1 shows a proxy method for utilizing an identifier of a request to route the request to a networked device, in accordance with one embodiment.

FIG. 1 shows a proxy method 100 for utilizing an identifier of a request to route the request to a networked device, in accordance with one embodiment. As shown in operation 102, a request for content stored on one of a plurality of devices connected to a network is received at a proxy. With respect to the present description, the devices may include any servers or other computers on a network storing content which is capable of being requested (e.g. over the network). For example, the devices may include servers of a multi-tenant on-demand database service storing content for tenants of the multi-tenant on-demand database service.

In the present description, such multi-tenant on-demand database service may include any service that relies on a database system that is accessible over the network, in which various elements of hardware and software of the database system may be shared by one or more tenants (e.g. customers). For instance, a given application server may simultaneously process requests for a great number of tenants, and a given database table may store rows for a potentially much greater number of tenants. Various examples of such a multi-tenant on-demand database service will be set forth in the context of different embodiments that will be described during reference to subsequent figures.

As noted above, the request for content stored on one of the devices connected to the network is received at a proxy. It should be noted that the proxy at which the request is received may include any device capable of proxying the request (e.g. via the network) to the device on which the content is stored. In one embodiment, the proxy may include a device of the aforementioned multi-tenant on-demand database service.

Further, the content being requested may include any type of data stored on one of the devices which is capable of being requested. Just by way of example, the content may include an application, web page, image, video, text, data, etc. In one embodiment, the content may be developed, published, provided, managed, etc. by one of the tenants of the multi-tenant on-demand database service described above.

Moreover, the request for the content may include any message received by the proxy (e.g. from a client device on the network, etc.) that is capable of being utilized to request the content. As an option, the request may include a uniform resource locator (URL) associated with the content. For example, the URL may point to or otherwise uniquely identify the content.

As also shown, the one of the plurality of devices on which the content is stored is determined, utilizing an identifier associated with the content that is included in the request. Note operation 104. The identifier associated with the content may include any indicator included in the request that is capable of being utilized to determine the device on which the content is stored. For example, the identifier may be uniquely assigned to the content and/or the device.

As an option, the identifier may include the above described URL associated with the content. As another option, the identifier may include only a predetermined portion of the URL associated with the content. For example, the identifier may include the domain name included in the URL.

Thus, the identifier may be utilized for requesting the content. Or, as another example, the identifier may include a portion of a string, etc. utilized for requesting the content. Of course, as another option, the identifier may be included in a body of a message comprising the request for the content.

In addition, the identifier may be utilized in any manner to determine the device on which the requested content is stored. In one embodiment, the device on which the content is stored may be determined by identifying the one of the devices to which the identifier is mapped. For example, each of the devices may be mapped (e.g. in a table, etc.) to a unique identifier, such that an identifier included in a request for content may be utilized to determine the device to which it is mapped.

Still yet, as shown in operation 106, the received request is routed to the determined one of the plurality of devices. For example, the received request may be routed from the proxy to the determined device. Such routing may include forwarding or otherwise transmitting in any manner the request to the determined device.

Accordingly, in response to determining the device on which the content is stored utilizing the aforementioned identifier included in the request for the content, the request for the content is routed to such determined device. The proxy may therefore be utilized for receiving the request for content, determining the device on which the content is stored, and proxying (e.g. routing) the same to the determined device. In this way, the device storing the requested content may receive the request, such that the device storing the content may respond to the request by providing the requested content (e.g. to the requesting device).

Figure 2:
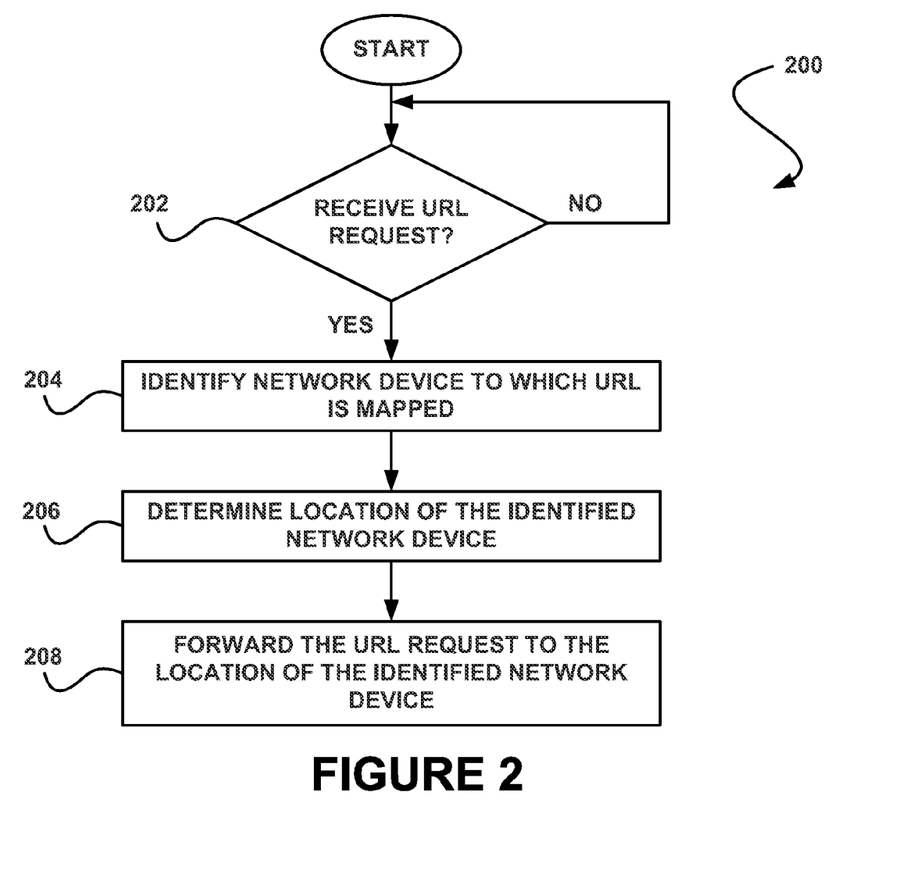
FIG. 2 shows a proxy method for determining a location of a networked device to which a request is to be forwarded, in accordance with another embodiment.

FIG. 2 shows a proxy method 200 for determining a location of a networked device to which a request is to be forwarded, in accordance with another embodiment. As an option, the present method 200 may be carried out in the context of the functionality of FIG. 1. For example, the proxy method 200 may be carried out utilizing the proxy described above with respect to FIG. 1. Of course, however, the method 200 may be carried out in any desired environment. The aforementioned definitions may apply during the present description.

As shown in operation 202, it is determined whether a URL request is received. With respect to the present embodiment, the URL request may include any request for content that is made utilizing a URL. For example, the URL request may include a URL received from a browser of an end user device (e.g. utilized by a client of a multi-tenant on-demand database service).

If it is determined that a URL request is not received, the method 200 continues to wait for a URL request to be received. However, upon determining that a URL request has been received, a network device to which the URL is mapped is identified. Note operation 204. In one embodiment, the URL, or optionally a predetermined portion thereof (e.g. domain name, etc.), may be utilized to look-up in a table (or any other type of data structure) a corresponding network device.

For example, the URL may be mapped to an identifier of a particular network device on which the requested content is located (or which is otherwise capable of responding to the URL request). With respect to such example, the identifier of the particular network device may be determined based on its mapping to the URL. It should be noted that the identifier of the network device may include any type of identifier capable of identifying the network device, such as a name, etc. of the network device.

Further, as shown in operation 206, a location of the identified network device is determined. With respect to the present embodiment, the location may include any identifiable location of the network device (e.g. on a network) capable of being utilized to forward the URL request for content to the network device. For example, the location may include an IP address of the network device.

In one embodiment, the location may be determined based on a mapping of the identifier of the network device to the location of such network device. Thus, separate tables may optionally be utilized for identifying the network device and for identifying the location of such network device. Of course, in another embodiment, the identifier of the network device (identified in operation 204) may be the location of the network device, such that operation 206 may not necessarily be carried out during operation of the method 200 of FIG. 2.

Moreover, the URL request is forwarded to the location of the identified network device. Note operation 208. In the present embodiment, the URL request may be forwarded by transmitting the URL to the location of the identified network device (e.g. such that the request is routed to the identified network device). Accordingly, the identified network device may respond to the URL request upon receipt thereof (e.g. by providing the content associated with the URL).

Figure 3:
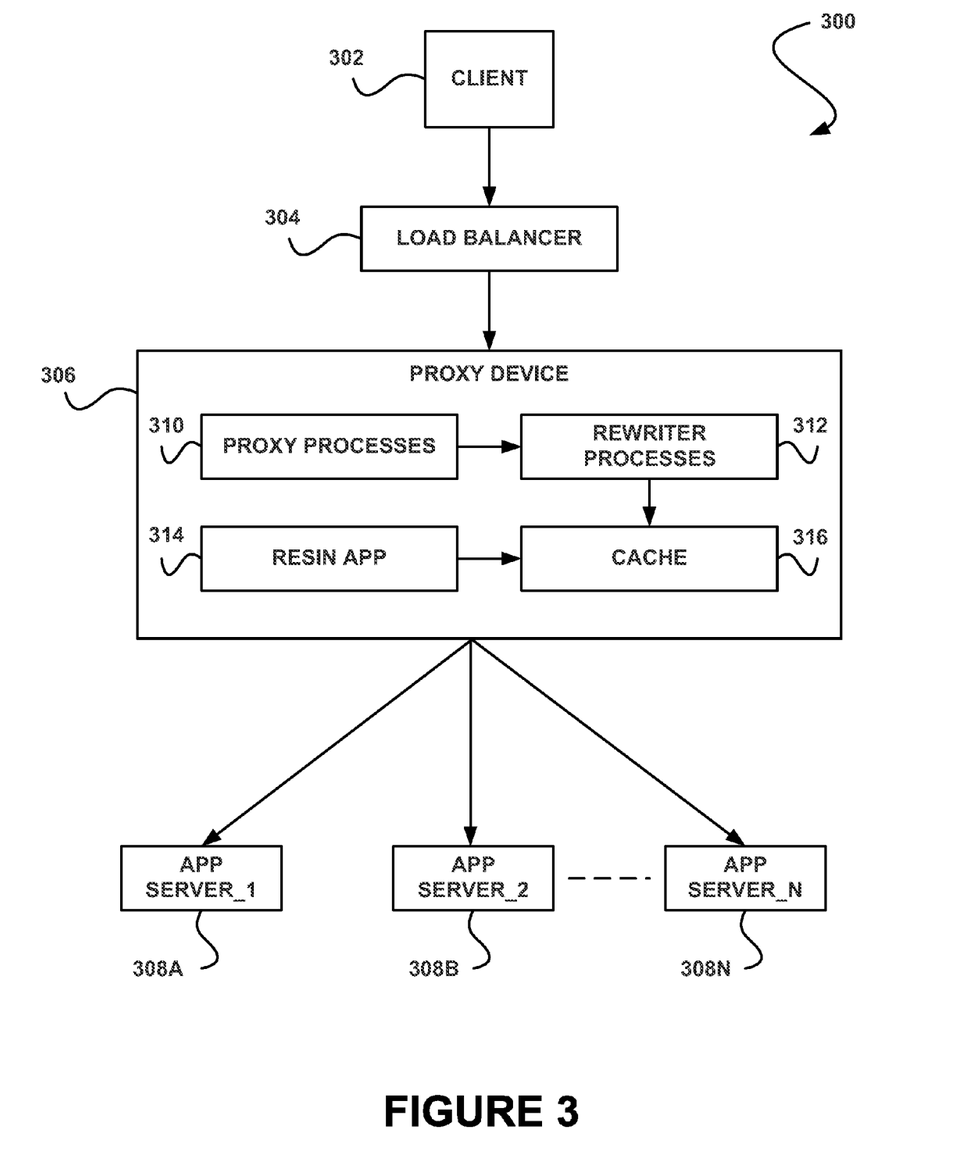
FIG. 3 shows a system including a proxy for utilizing an identifier of a request to route the request to a networked device, in accordance with yet another embodiment.

FIG. 3 shows a system 300 including a proxy for utilizing an identifier of a request to route the request to a networked device, in accordance with yet another embodiment. As an option, the system 300 may be implemented in the context of the functionality of FIGS. 1-2. Of course, however, the system 300 may be implemented in any desired environment. Again, the aforementioned definitions may apply during the present description.

As shown, a client 302 is in communication with a load balancer 304. The client 302 may include any device capable of issuing a request for content over a network. For example, the client 302 may include a browser from which a URL request may be sent to the load balancer 304 (e.g. by entering the URL into the browser, etc.).

Additionally, the load balancer 304 may include any device capable of being utilized to receive the request for content from the client 302 and forward the request to a proxy device 306. In one embodiment, the load balancer 304 may be in communication with a plurality of proxy devices (not shown), such that the load balancer 304 may select one of the proxy devices to which the request for content is forwarded. For example, the load balancer 304 may select the one of the proxy devices based on a load (e.g. amount of processing resources consumed, etc.) of the proxy devices, such that a load across the proxy devices is balanced.

In another embodiment, the load balancer 304 may be in communication with a plurality of proxy processes 310 (e.g. running on different ports) of the proxy device 306. For example, the load balancer 304 may select one of the proxy processes 310 to which the request for content is forwarded. For example, the load balancer 304 may select the one of the proxy processes 310 based on a load (e.g. amount of processing resources consumed, etc.) of the proxy processes 310, such that a load across the proxy processes 310 is balanced. It should be noted that while the load balancer 304 is shows as separate from the proxy device 306, in another embodiment the load balancer 304 may be a component of the proxy device 306.

Upon receipt of the request for content for processing by one of the proxy processes 310, the proxy process 310 that received the request forwards the request for content to one of a plurality of rewriter processes 312 of the proxy device 306. In one embodiment, each of the proxy processes 310 may start a plurality of rewriter processes 312, for use as described below. In particular, the rewriter processes 312 may optionally be utilized for determining an application server 308A-N on which the requested content is stored. For example, as shown, the rewriter process 312 that receives the request from the proxy process 310 may determine the application server 308A-N on which the requested content is stored, utilizing cache memory 316 of the proxy device 306.

The cache memory 316 may store, for any particular content, a mapping of an identifier capable of being included in a request for the content (e.g. included in a URL, etc.) to the application servers 308A-N on which the content is stored. Thus, the rewriter process 312 that receives the request from the proxy process 310 may look-up in the cache memory 316 the one of the application servers 308A-N that is mapped to the identifier included in the request. In this way, the rewriter process 312 may query the cache memory 316 to determine the one of the application servers 308A-N on which the requested content is stored.

As an option, the cache memory 316 may be shared amongst the rewriter processes 312 of all of the proxy processes 310. As another option, the cache memory 316 may be populated with the aforementioned identifier/application servers 308A-N mappings utilizing a resin application 314 of the proxy device 306. The resin application 314 may itself store the above described mappings, and may provide the same (e.g. periodically, etc.) to the cache memory 316 for populating the cache memory 316, in one embodiment.

In another embodiment, the resin application 314 may receive the mappings from the application servers 308A-N, each of which may also locally store the mappings. For example, the resin application 314 may periodically pull the mappings from each of the application servers 308A-N, store such mappings locally, and further push such mappings to the cache memory 316 for storage therein.

Still yet, upon the rewriter process 312 determining the one of the application servers 308A-N on which the requested content is stored, as described above, the rewriter process 312 forwards the request for content to the determined one of the application servers 308A-N. Accordingly, the proxy device 306 may communicate (e.g. over a network, etc.) with each of the application servers 308A-N. To this end, the proxy device 306 may be an intermediary between the client 302 and the application servers 308A-N.

By utilizing the load balancer 304 for receiving requests for content from various clients (e.g. client 302), different requests for content (e.g. where different requested content is stored on different ones of the application servers 308A-N) may be received at a single location (e.g. utilizing a single IP address). Thus, direct communication from the clients to the application servers 308A-N may be avoided. For example, multiple requests for content stored on different ones of the application servers 308A-N (e.g. and thus each including a different URL) may be received at the proxy device 306, for being routed to the different ones of the application servers 308A-N. In this way, the proxy device 306 may be utilized such that the multiple requests may be received at a single IP address.

Furthermore, where different content managed by different sources are stored on a single application server 308A-N, the different sources may utilize different identifiers (e.g. domain names, etc.) for identifying their content. In addition, the various application servers 308A-N may each be associated with a different identifier (e.g. name, etc.), without necessarily requiring a different IP address for each of the application servers 308A-N.

Still yet, the sources may migrate their content from one of the application servers 308A-N to another, and the proxy device 306 may automatically (e.g. via the functionality of the resin application 314) update its identifier/application server 308A-N mappings to reflect the migration, such that subsequent requests for the migrated content may be routed to the new application server 308A-N to which the content has been migrated (e.g. without necessarily having to wait for external caches storing out-of-date DNS mappings to be updated, which may take longer than the automatic update to the identifier/application server 308A-N mappings).

It should be noted that with respect to the present embodiment shown in FIG. 3, the load balancer 304, proxy device 306 and/or application servers 308A-N may be components of a multi-tenant on-demand database service. Furthermore, the client device 302 may be utilized by one of the tenants of the multi-tenant on-demand database service for requesting content stored by the application servers 308A-N of the multi-tenant on-demand database service. Additional embodiments of the components of the system 300 described above are provided below. Of course, it should be noted that such embodiments are set forth for illustrative purposes only, and thus should not be construed as limiting in any manner.

In one embodiment, the proxy device 306 may utilize Squid, such that the proxy processes 310 may each include Squid processes. A configuration parameter provided by Squid called url_rewrite_program may specify the path to a program (e.g. written in any language) that will rewrite URLs. The url_rewrite_children parameter may determine the number of processes of the url_rewrite_program squid will create when it starts up to handle the requests for content. Optionally, the url_rewrite_host_header parameter may be disabled so that the URL is maintained when it hits the application servers 308A-N. The output of the rewriter processes 312 may be prefixed with a !urlgroup! which may be used to match on the correct cache_peer that determines the one of the application servers 308A-N to which the request is to be routed.

The rewriter processes 312 may each include a program configured as the url_rewrite_program in Squid that may rewrite requests. The program can be written in any language (e.g. Java™, Perl, C, etc.). The program may start up and be waiting to read URLs on System.in and rewrite URLs on System.out. The program may take in a URL and lookup which of the application servers 308A-N it should be mapped to based on the domain name. The mapping may be provided by cache memory 316 shared across the rewriter processes 312, to increase efficiency by avoiding a separate local in-memory map being stored for each of the rewriter processes 312.

The cache memory 316 may include memcache (e.g. a memcached client) on the proxy device 306 which may maintain the mapping from domain name to application servers 308A-N. The cache memory 316 may hold all of the mappings for all application servers 308A-N. In one embodiment, the cache memory 316 may store the mappings as strings, and each proxy device may store its own cache memory 316 for increasing a speed at which lookups are performed. Further, the cache memory 316 may have an entry for a flag indicating whether the cache memory 316 has been populated with the mappings. If a rewriter process 312 determines that its cache memory 316 has not been populated, the rewriter process 312 may use cache memory 316 of another proxy device 306 to determine the application server 308A-N storing the requested content, or may optionally send the request to a random one of the application servers 308A-N, such that the random one of the application servers 308A-N may determine from its locally stored mapping the application server 308A-N storing the requested content.

The resin application 314 may include a process that populates the cache memory 316 with the mappings and that keeps the mappings updated. This may optionally be a small application running in resin on each proxy device. Every predetermined number of minutes (e.g. 15), the resin application 314 may query a random application servers 308A-N for either the most recent mappings stored by the application server 308A-N if the cache memory 316 is already populated, or for all the mappings if the cache memory 316 is empty. A servlet may be utilized to returns all mappings, and in other embodiments may take in a sysmodstamp to be more efficient. The resin application 314 may make sure that the cache memory 316 has an up-to-date list of mappings. In addition, it can have a ping.jsp that the load balancer 304 can use to determine if the proxy device 306 is up and running. In this case, up and running may be a situation where the proxy processes 310 are running and the cache memory 316 is running and has a populated cache.

As an option, Canonical Name record (CNAMEs) to the proxy device 306 may be created (e.g. instead of to a specific application server 308A-N). In addition, all of the existing CNAMES in DNS may be updated to point to the proxy device 306. For each grouping of application servers 308A-N, a separate proxy device 306 may be provided an the CNAME for a particular tenant associated with a particular an application server 308A-N in a particular group may point to the proxy device provided for that particular group. Further, a load balancer 304 may be provided for each proxy device (e.g. to load balance the requests across the different proxy devices 306, and also strip off hypertext transfer protocol secure (https) and insert the cipher-suite header into the requests).

It should be noted that enough file descriptors may be provided to support the number of rewriter processes 312 as well as the real-time requests that Squid is serving. As an option, in response to the cache memory 316 being inoperable or otherwise non-functional in any manner, the load balancer 304 may be notified such that it may stop sending requests to the proxy device 306 with that cache memory 316 until the cache memory 316 is restarted. This notification may be provided using a ping.jsp in the Java™ application that relays the health of the cache memory 316 to the load balancer 304.

The proxy device 306 may be located in front of all application servers 308A-N in a group associated with the proxy device 306. Various techniques may be utilized to ensure that operability of the proxy device 306 is maintained. In one embodiment, if one of the proxy processes 310 becomes inoperable, the load balancer 304 may stop serving requests to it, where the health of all the proxy processes 310 may be monitored to make sure they become operable again quickly. This monitoring may be automated.

In another embodiment, if the resin application 314 becomes in operable, the proxy device 306 may continue to function correctly (e.g. but may not necessary receive any new mappings). The operability of the resin application 314 may also be monitored and may be brought back up when needed. The rewriter processes 312 of a particular proxy device 306 may know about the cache memory 316 running on other proxy devices. If a rewriter process' 312 local cache memory 316 is inoperable, it can try one or more of the other cache memories 316 running on the other proxy devices. A Java™ application may be monitoring the local cache memory 316 so even if it becomes in operable, it may not necessarily last for more than a few seconds.

An internal page may be used to restart/refresh cache memory 316 manually in the case that the monitoring resin application 314 does not function as noted above. If a local cache memory 316 miss occurs, the rewriter process 312 may contact one of the other cache memories 316. If all the proxy devices 306 become in operable, the load balancer 304 may be updated to forward the request to a random application server 308A-N and then allow the application server 308A-N receiving the request to use its local mapping to proxy the request to the application server 308A-N storing the requested content.

As a further option, the proxy device 306 may include other cache memory (not shown) for storing previously requested content. For example, an application server 308A-N may respond to a received request for content by providing the requested content to a client 302 via the proxy device 306. With respect to such example, the proxy device 306 may locally store the requested content being communicated to the client 302. Thus, if it is determined by the proxy device 306 that requested content is stored in cache memory of the proxy device 306 (e.g. due to a previous request for the content in which an application server 308A-N storing the content provided the content via the proxy device 306), the above described determination of the application server 308A-N storing the requested content may be avoided, and the requested content may be directly provided to the client 302 from the cache memory of the proxy device 306. Accordingly, the application server 308A-N storing the requested content may only be conditionally determined based on whether cache memory of the proxy device 306 stores the requested content.

System Overview

Figure 4:
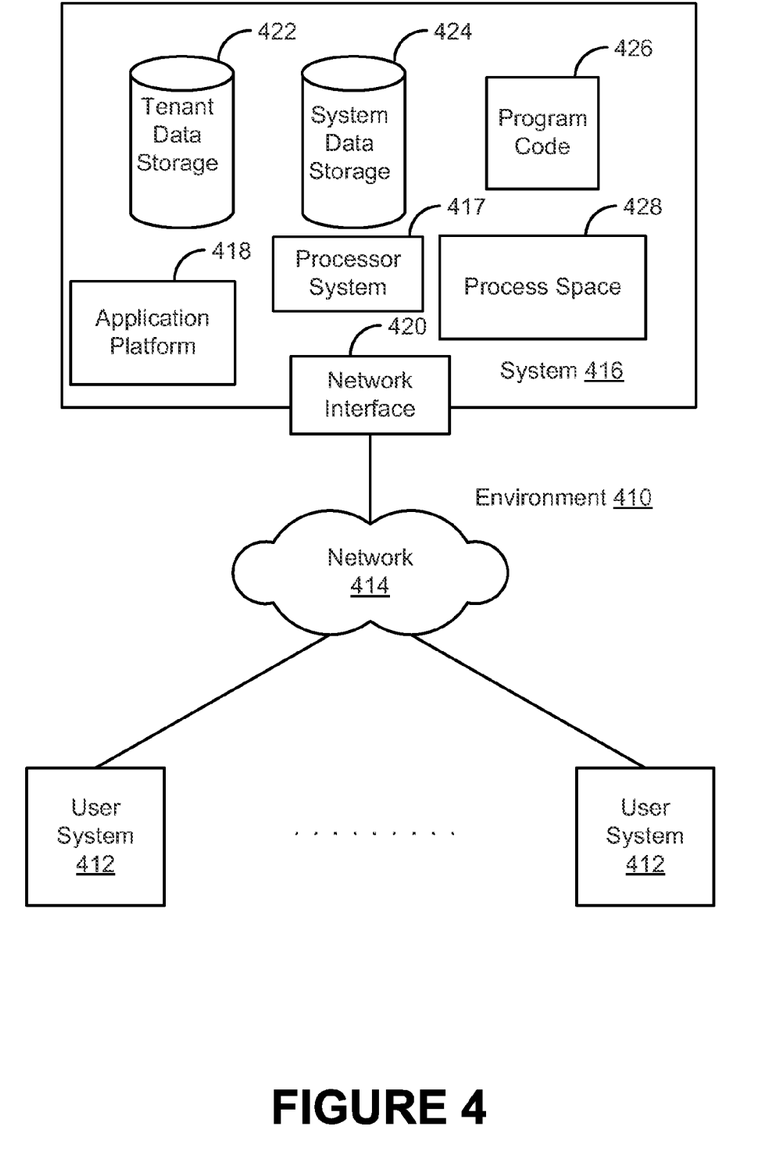
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and, in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
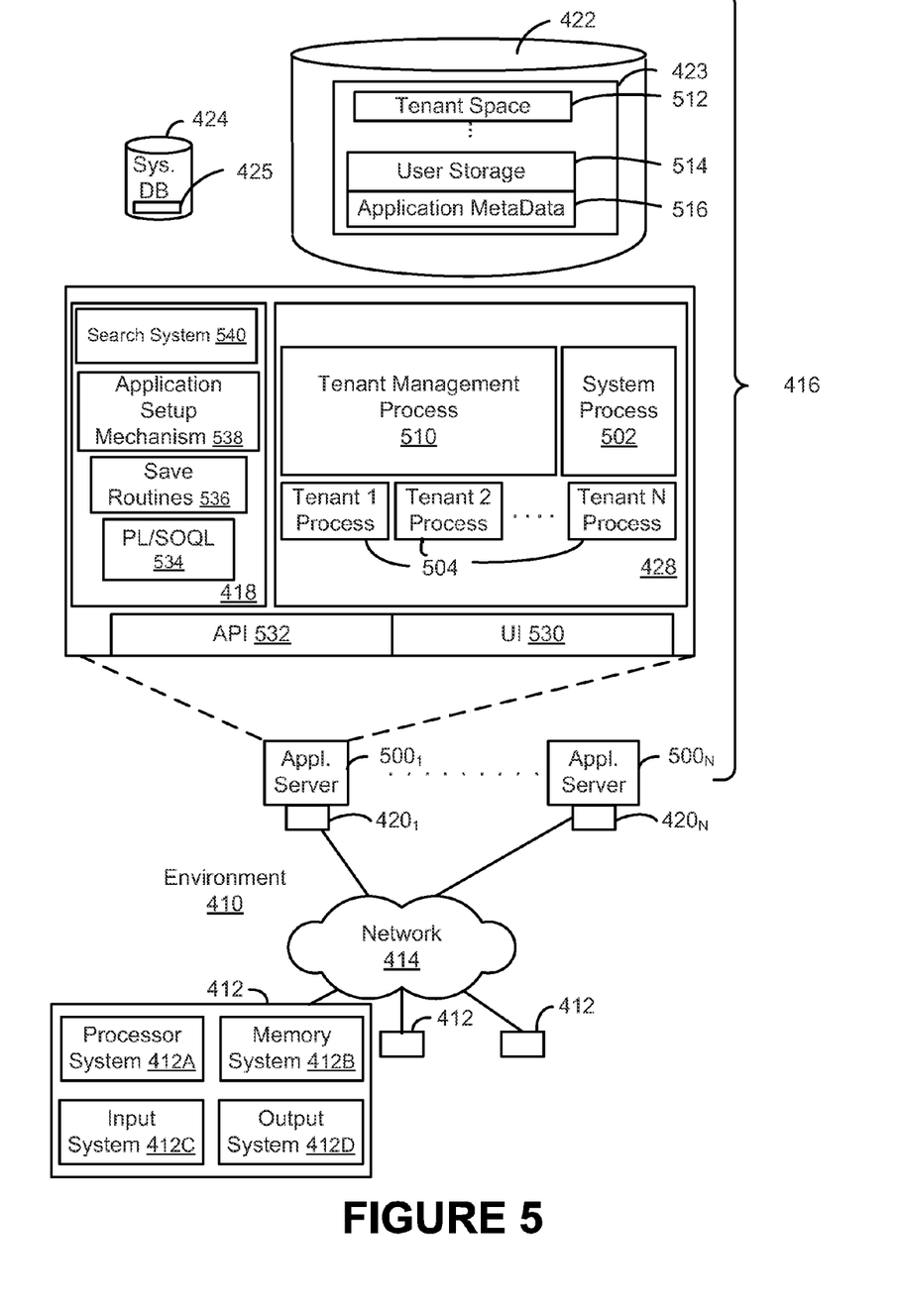
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multitenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; and/or US2008/0010243, titled "METHOD AND SYSTEM FOR PUSHING DATA TO A PLURALITY OF DEVICES IN AN ON-DEMAND SERVICE ENVIRONMENT," filed Jun. 1, 2007; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code causing a computer to implement a method, the method comprising:
   receiving from a requesting device at a proxy of a multi-tenant on-demand database service a request for content provided by one or more of a plurality of tenants of the multi-tenant on-demand database service, the multi-tenant on-demand database service including hardware and software shared by the plurality of tenants, where the request includes a unique uniform resource locator (URL);
   determining by the proxy an internet protocol (IP) address of a network device of the multi-tenant on-demand database service on which the content is located, utilizing a mapping between the IP address and the unique URL, wherein the mapping is stored within a table on the proxy;
   forwarding, by the proxy, the request including the unique URL to the network device of the multi-tenant on-demand database service, utilizing the determined IP address of the network device; and
   receiving at the requesting device, from the network device via the proxy, the requested content, in response to the receipt of the forwarded request.

2. The computer program product of claim 1, wherein the content includes an application.

3. The computer program product of claim 1, wherein the network device includes a server of the multi-tenant on-demand database service storing content for one or more of the plurality of tenants of the multi-tenant on-demand database service.

4. The computer program product of claim 1, wherein the computer program product is operable such that the request is received by one of a plurality of proxy processes of the proxy selected by a load balancer.

5. The computer program product of claim 1, wherein the computer program product is operable such that the mapping is stored in a cache memory of the proxy.

6. The computer program product of claim 5, wherein the network device locally stores the mapping, and the computer program product is operable such that the cache memory is populated with the mapping of the network device by the network device.

7. The computer program product of claim 1, further comprising determining whether cache memory of the proxy stores the content.

8. The computer program product of claim 7, wherein the computer program product is operable such that the network device is identified based on the determining of whether the cache memory of the proxy stores the content.

9. The computer program product of claim 1, further comprising identifying a migration of the content to a new network device, and changing the mapping, in response to the identifying.

10. A method, comprising:
- receiving from a requesting device at a proxy of a multi-tenant on-demand database service a request for content provided by one or more of a plurality of tenants of the multi-tenant on-demand database service, the multi-tenant on-demand database service including hardware and software shared by the plurality of tenants, where the request includes a unique uniform resource locator (URL);
- determining by the proxy an internet protocol (IP) address of a network device of the multi-tenant on-demand database service on which the content is located, utilizing a mapping between the IP address and the unique URL, wherein the mapping is stored within a table on the proxy;
- forwarding, by the proxy, the first request including the unique URL from the proxy to the network device of the multi-tenant on-demand database service, utilizing the determined IP address of the network device; and
- receiving at the requesting device, from the network device via the proxy, the requested content.

11. An apparatus, comprising:
a processor for:
- receiving from a requesting device at a proxy of a multi-tenant on-demand database service a request for content provided by one or more of a plurality of tenants of the multi-tenant on-demand database service, the multi-tenant on-demand database service including hardware and software shared by the plurality of tenants, where the request includes a unique uniform resource locator (URL);
- determining by the proxy an internet protocol (IP) address of a network device of the multi-tenant on-demand database service on which the content is located, utilizing a mapping between the IP address and the unique URL, wherein the mapping is stored within a table on the proxy;
- forwarding, by the proxy, the first request including the unique URL from the proxy to the network device of the multi-tenant on-demand database service, utilizing the determined IP address of the network device; and
- receiving at the requesting device, from the network device via the proxy, the requested content.

12. A method for transmitting code for use in a multi-tenant database system on a transmission medium, the method comprising transmitting code for:
- receiving from a requesting device at a proxy of a multi-tenant on-demand database service a request for content provided by one or more of a plurality of tenants of the multi-tenant on-demand database service, the multi-tenant on-demand database service including hardware and software shared by the plurality of tenants, where the request includes a unique uniform resource locator (URL);
- determining by the proxy an internet protocol (IP) address of a network device of the multi-tenant on-demand database service on which the content is located, utilizing a mapping between the IP address and the unique URL, wherein the mapping is stored within a table on the proxy;
- forwarding, by the proxy, the first request including the unique URL from the proxy to the network device of the multi-tenant on-demand database service, utilizing the determined IP address of the network device; and
- receiving at the requesting device, from the network device via the proxy, the requested content.

* * * * *